(12) United States Patent
Yeh

(10) Patent No.: US 7,320,601 B1
(45) Date of Patent: Jan. 22, 2008

(54) POWER STORAGE STRUCTURE

(76) Inventor: Ming-Hsiang Yeh, 14F, No. 375, Nan-Gang District, Fu De Street, Taipei City (TW)

( * ) Notice: Subject to any disclaimer, the term of this patent is extended or adjusted under 35 U.S.C. 154(b) by 0 days.

(21) Appl. No.: 11/603,112

(22) Filed: Nov. 22, 2006

(51) Int. Cl.
*H01R 12/00* (2006.01)

(52) U.S. Cl. ........................................... 439/62

(58) Field of Classification Search ............... 439/62, 439/188, 441, 760; 362/182, 185; 307/140
See application file for complete search history.

(56) References Cited

U.S. PATENT DOCUMENTS 6,874,907 B2* 4/2005 Liao ...................... 362/183
6,965,518 B2* 11/2005 Wu ........................ 363/146
7,133,703 B2* 11/2006 Aoshima et al. ............ 455/574

* cited by examiner

*Primary Examiner*—J. F. Duverne
(74) *Attorney, Agent, or Firm*—Troxell Law Office, PLLC

(57) ABSTRACT

A power storage structure comprises a mother element having a rechargeable battery mounted on the inside and at least a socket, a power plug, and a coupling part on the outside. The coupling part is for coupling with a daughter element. The daughter element is a transformer and has a switch, an output terminal, and an input terminal mounted thereon. As a result, the power storage structure acts as an uninterruptible power system when the mother element couples with the daughter element via the coupling part. In addition, it is unnecessarily to detach the electric appliance's plug from the mother element when the daughter element is detached from the mother element for outdoor use so as to supply various power sources for electric appliances.

6 Claims, 6 Drawing Sheets

POWER STORAGE STRUCTURE

FIELD OF THE INVENTION

The present invention relates to a power storage structure, and more particularly to a power storage structure acting as an uninterruptible power system or a power source for supplying electric power for indoor precision instruments and outdoor electric appliances.

BACKGROUND OF THE INVENTION

For the purpose of reducing the damage loss of the electric instruments, an uninterruptible power system (UPS) is disclosed to supply uninterruptible, stable, and reliable electric power for the electric instruments. The UPS system is generally composed of a rechargeable battery and an inverter. When in use, the UPS system is connected to the commercial power, and the electric instruments are then connected with the UPS system, wherein the UPS system is a load of the electrified power network. When the commercial power is interrupted suddenly, the UPS system can supply the electric instruments with the stored electric power to enable the electric instruments to work normally.

The UPS system enables the electric instruments to work normally during the power failure so as to provide the user with sufficient time to backup the data or wait for the restoration of the commercial power service, but the occurrence of power failure is very sudden and rare. The UPS system is always placed against the wall silently to wait for the occurrence of next power failure. Therefore, the UPS system is only workable during the power failure so it is not good.

In view of the foregoing description, the motive of the present invention is to provide an indoor/outdoor usable power storage structure with effectively improved practicability.

SUMMARY OF THE INVENTION

It is a major object of the present invention to provide an indoor/outdoor usable power storage structure with effectively improved practicability.

In order to achieve the above-mentioned objects, a power storage structure is comprised of a mother element having a rechargeable battery mounted on the inside and at least a socket, a power plug, and a coupling part on the outside. The coupling part is for coupling with a daughter element. The daughter element is a transformer and has a switch, an output terminal, and an input terminal mounted thereon. As a result, the power storage structure acts as an uninterruptible power system when the mother element couples with the daughter element via the coupling part. In addition, it is unnecessarily to detach the electric appliance's plug from the mother element when the daughter element is detached from the mother element for outdoor use so as to supply various power sources for electric appliances.

The aforementioned objects and advantages of the present invention will be readily clarified in the description of the preferred embodiments and the enclosed drawings of the present invention.

DETAILED DESCRIPTION OF THE PREFERRED EMBODIMENT

Figure 1:
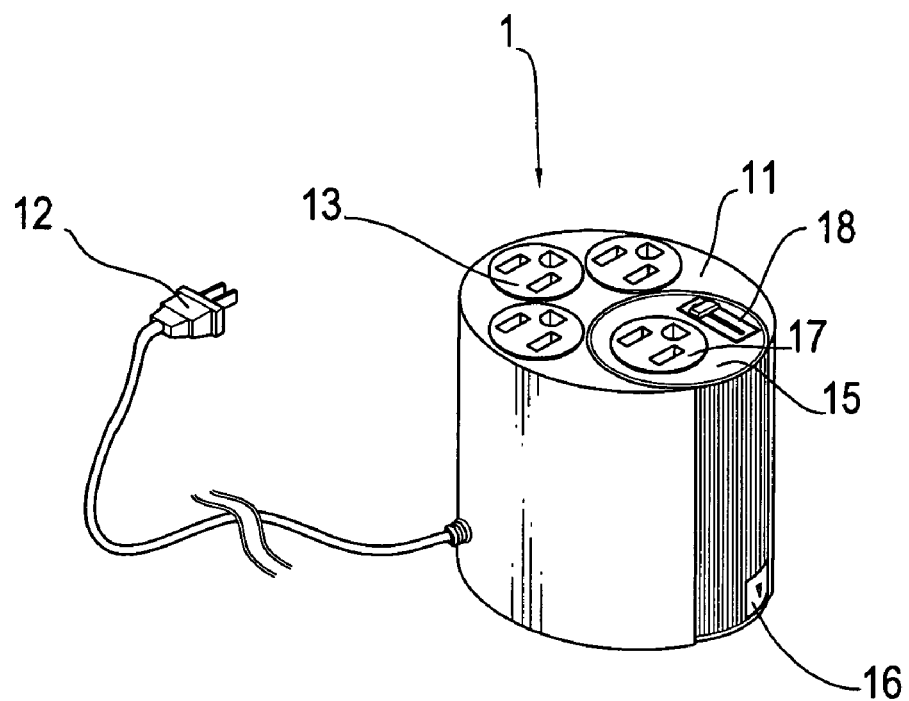
FIG. 1 is an elevational view showing a preferred embodiment of the present invention.
Figure 2:
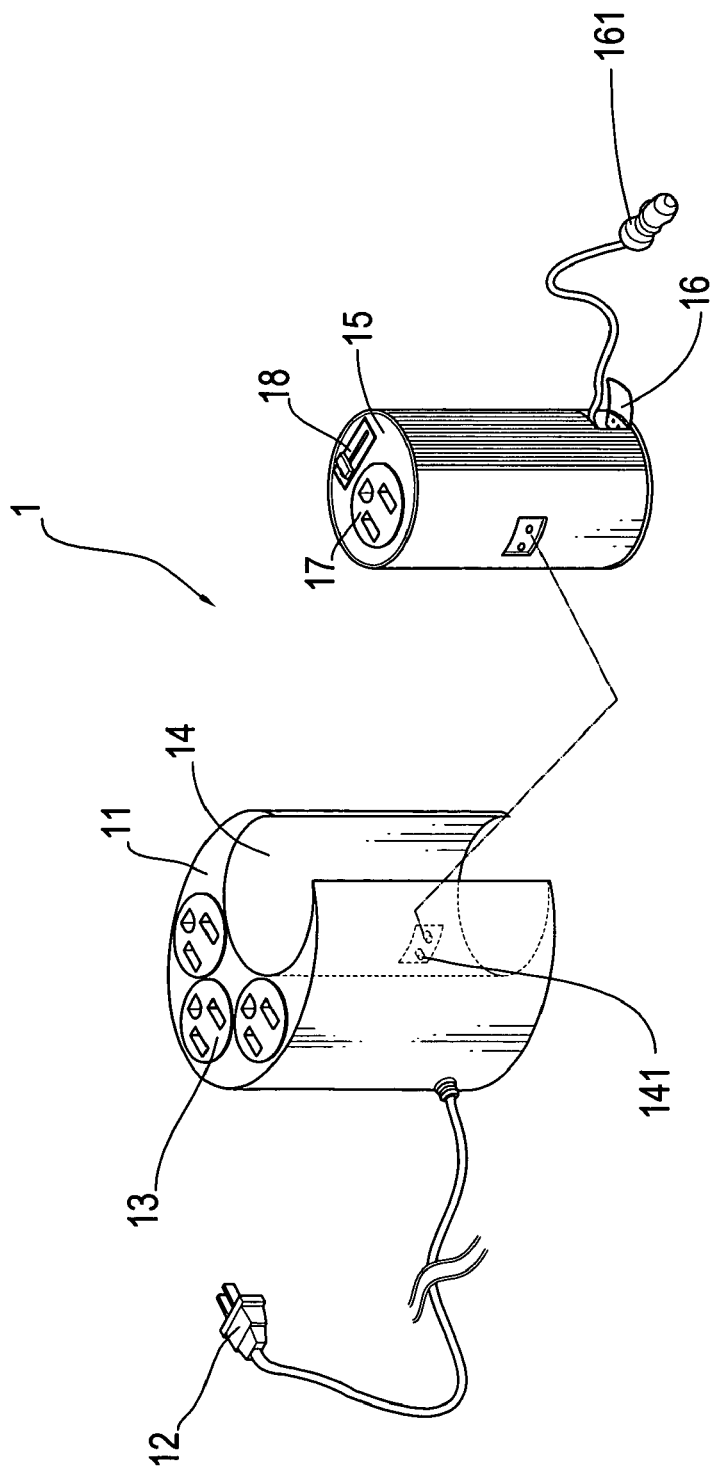
FIG. 2 is a disassembled view showing the components of the preferred embodiment of the present invention.

Referring to FIGS. 1 and 2, a power storage structure 1 of the present invention comprises a mother element 11 and a daughter element 15. The mother element 11 is a short cylinder having a power plug 12, at least a socket 13 such as three sockets in this preferred embodiment, and a coupling part 14 mounted thereon. In this preferred embodiment, the coupling part 14 is an open embedded trench having a contact terminal 141 mounted therein.

The daughter element 15 is for insertion into the coupling part 14 of the mother element 11. In this preferred embodiment, the daughter element 15 is also a cylinder fitted in with the embedded trench. In addition, the daughter element 15 has a contact part (shown in FIG. 2) on the surface corresponding to the contact terminal 141 for electrically connecting with the contact terminal 141. The daughter element 15 has at least an output terminal 17 and a switch 18. In this preferred embodiment, the output terminal 17 is a socket. The switch 18 is for selecting the power output of the output terminal 17 or for switching the outputted current of the output terminal 17 to the direct current (DC) or the alternating current (AC). The daughter element 15 has a liftable part 16 on the cylindrical body. An input terminal 161 is mounted on the inside of the liftable part 16. In this preferred embodiment, the input terminal 161 is a cigar-lighter plug.

Figure 3:
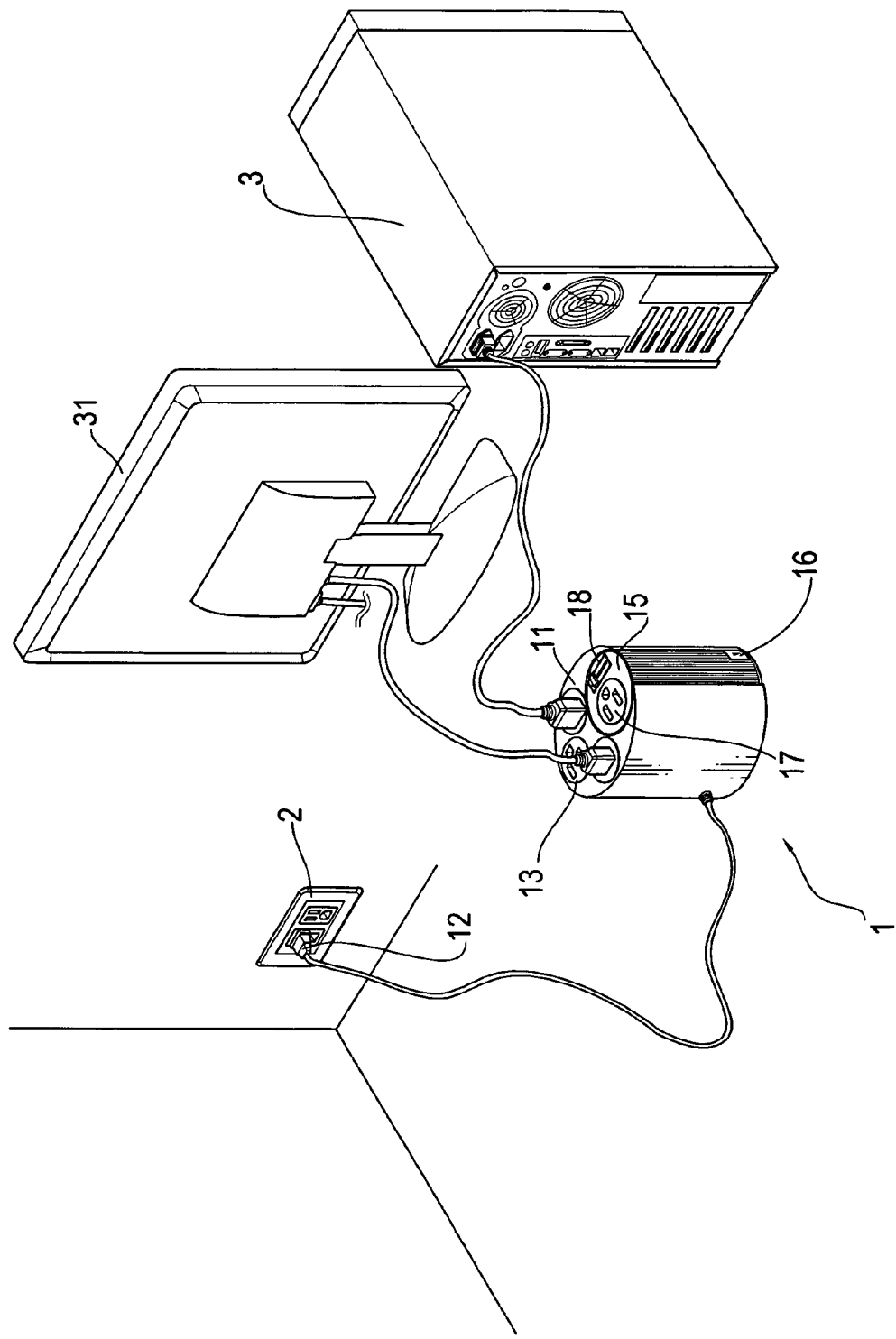
FIG. 3 is a schematic view showing a first kind of usage of the preferred embodiment of the present invention.

In addition, if the power storage structure 1 is for indoor use, as shown in FIG. 3, the power plug 12 is inserted into an indoor socket 2, and a plug of a computer 3 and a plug of a monitor 31 are then inserted into the socket 13 of the mother element 11 so that the power storage structure 1 can supply the required electric power for operation of the computer 3 and the monitor 31 and that the rechargeable battery, which is mounted inside the mother element 11, can be charged simultaneously. Accordingly, if the commercial power service is interrupted, the mother element 11 can switch on a power supply mechanism automatically to provide with sufficient time for storing the data before shutting down the computer 3.

Figure 4:
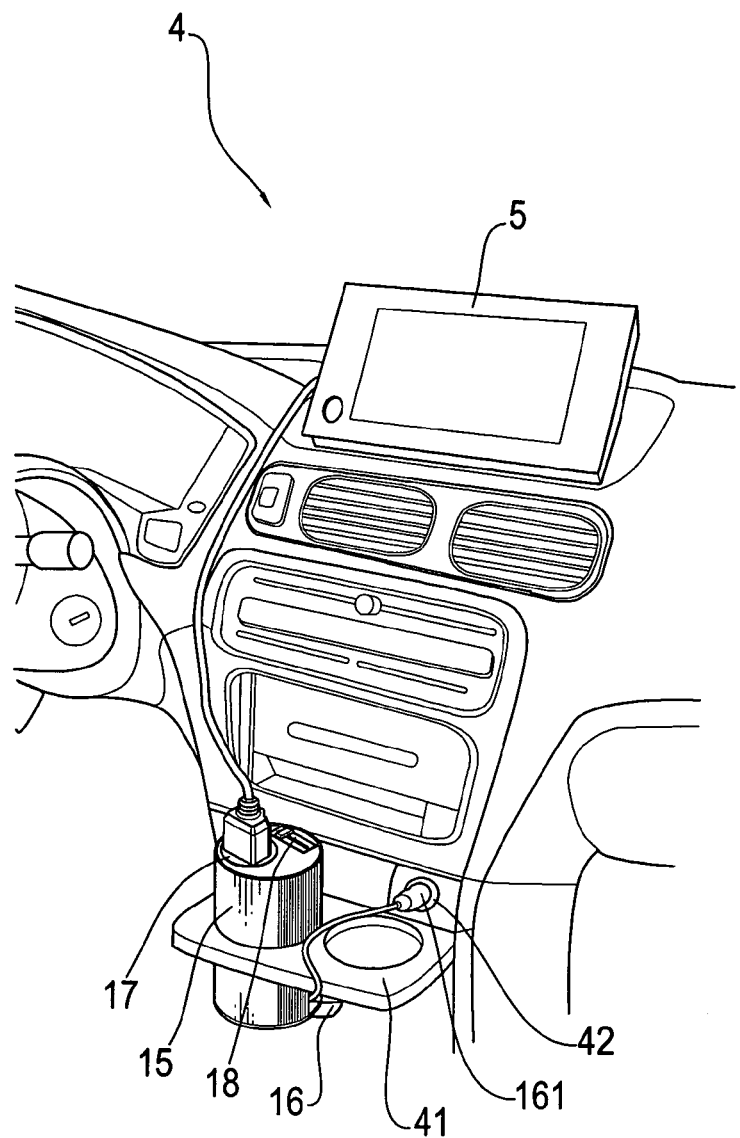
FIG. 4 is a schematic view showing a second kind of usage of the preferred embodiment of the present invention.

If the power storage structure 1 is for outdoor use, the daughter element 15 can be detached from the coupling part 14 of the mother element 11 directly so as to separate the daughter element 15 from the mother element 11. At this moment, it is unnecessarily to pull out the electric appliance's plug from the mother element 11. Accordingly, the electric appliance is still workable via the mother element 11, and the operation of the electric appliance is not affected by the detachment of the daughter element 15. At this moment, the mother element 11 acts as a pure extender, but not an uninterruptible power system. Moreover, the detached cylindrical daughter element 15 can be conveniently held by a car's beverage holder. At this moment, if there is a need to use a personal digital assistant (PDA) 5, which is deficient in electric power, the liftable part 16 can be lifted up so that the input terminal 161 can be inserted into the cigar lighter 42 of the car 4. Next, a power plug of the PDA 5 can be inserted into the output terminal 17 of the daughter element 15. In addition, the power output of the output terminal 17 can be selected by the switch 18, and the outputted current of the output terminal 17 can be also switched to the direct current (DC) or the alternating current (AC) by the switch 18. Accordingly, as shown in FIG. 4, the PDA 5, which is originally deficient in electric power, is workable since it is supplied with sufficient electric power.

Figure 5:
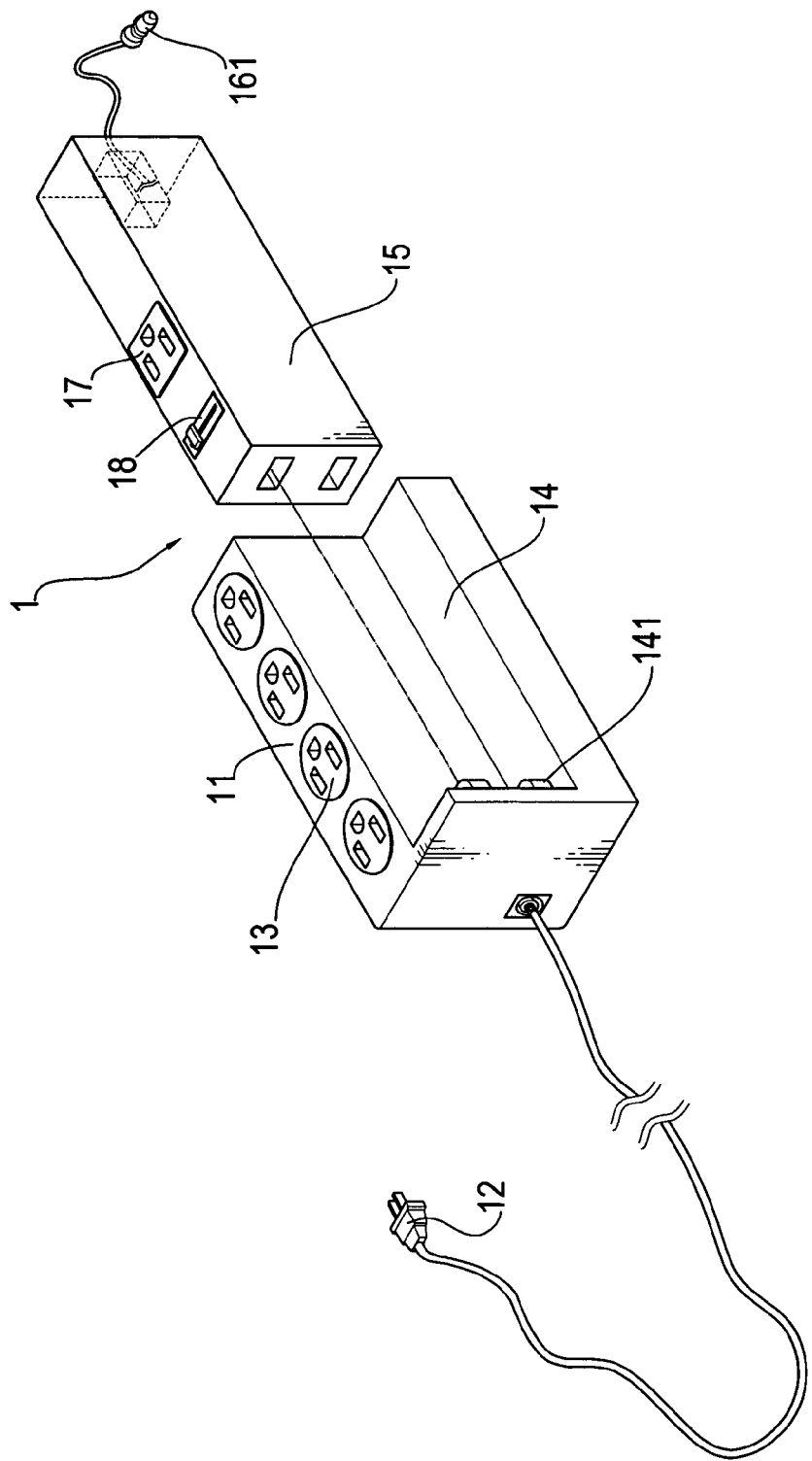
FIG. 5 is an elevational view showing another preferred embodiment of the present invention.

In addition, as shown in FIG. 5, another preferred embodiment of the present invention is shown. The mother element 11 is a rectangular solid having a power plug 12, at least a socket 13, and a coupling part 14. Four sockets are utilized in this preferred embodiment. The coupling part 14 is an open rectangular trench having a contact terminal 141 mounted therein. The daughter element 15 is fitted for the coupling part 14 for insertion into the coupling part 14 of the mother element 11. In addition, the daughter element 15 has a contact part on the surface corresponding to the contact terminal 141 for electrically connecting with the contact terminal 141 of the coupling part 14. The daughter element 15 has a liftable part 16, at least an output terminal 17, and a switch 18 on the body. An input terminal 161 is mounted on the inside of the liftable part 16. In this preferred embodiment, the input terminal 161 is a cigar-lighter plug. The switch 18 is for switching the outputted current of the output terminal 17 to the direct current (DC) or the alternating current (AC).

Figure 6:
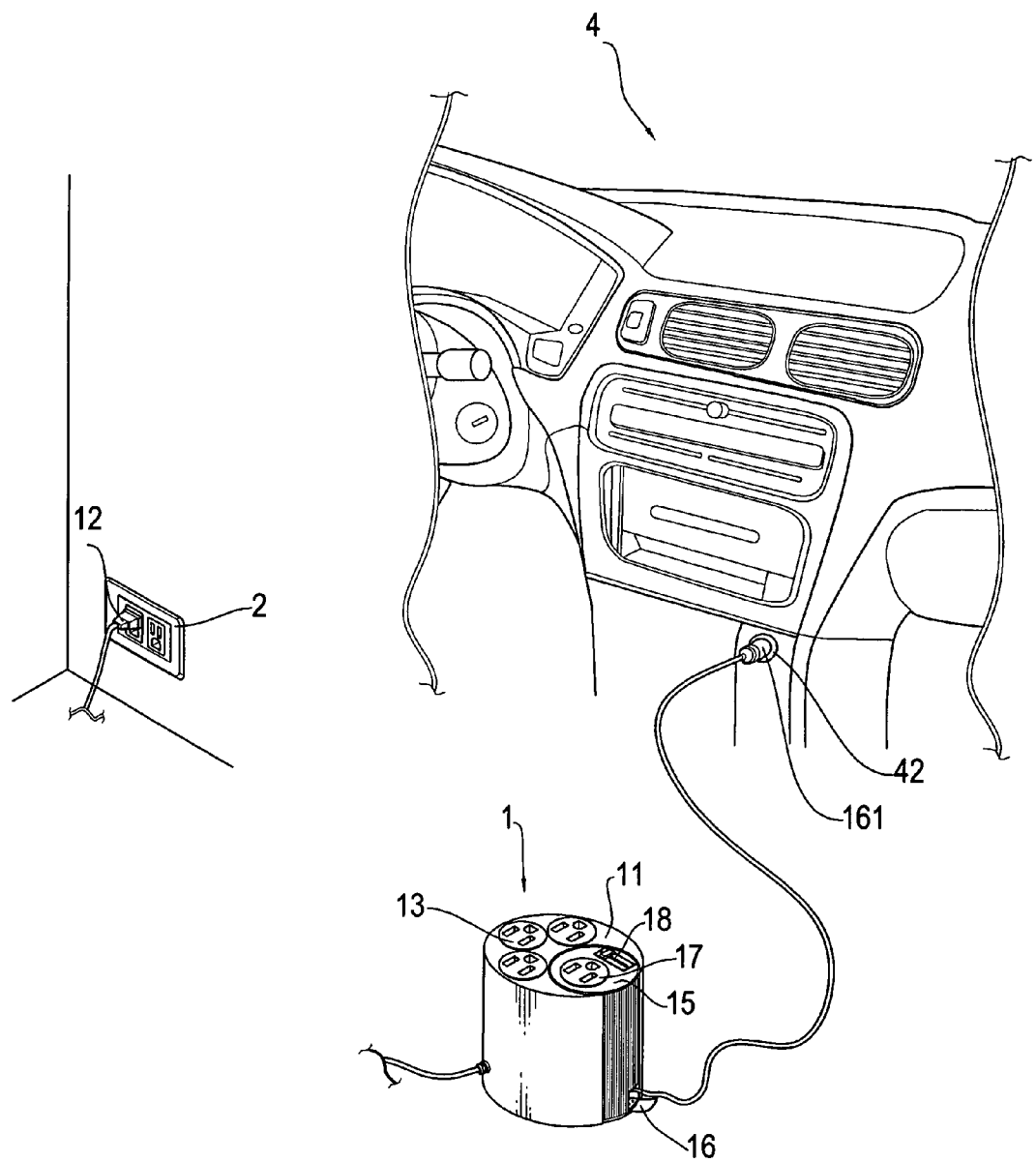
FIG. 6 is a schematic view showing a third kind of usage of the preferred embodiment of the present invention.

Referring further to FIG. 6, the power plug 12 of the power storage structure 1 of the present invention can be inserted into the indoor socket 12, and the input terminal 161 mounted inside the liftable part 16 can be inserted into the cigar lighter 42 of the car 4 so that the indoor electric power can be utilized for charging the storage battery of the car 4.

In accordance with the foregoing description, the present invention has the following advantages:

1. The power storage structure of the present invention acts as an uninterruptible power system to protect the electric appliance and data effectively.

2. If the mother element and the daughter element are separated from each other, the electric appliance is workable and it is unnecessary to pull out the electric appliance's plug that inserts into the mother element. In addition, the separated daughter element can be held by the car's beverage holder so as to supply the electric power storied in the storage battery of the car for the electric appliance. Accordingly, it is very convenient.

In summary, the power storage structure of the present invention indeed achieves the anticipated objects. Accordingly, the present invention satisfies the requirement for patentability and is therefore submitted for a patent.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. A power storage structure comprising:
    a) a mother element having:
        i) a rechargeable battery located on an interior thereof;
        ii) at least one socket providing an output power;
        iii) a plug for receiving an alternating current; and
        iv) a coupling part, the at least one socket, the plug, and the coupling part are located on an exterior of the mother element; and
    b) a daughter element removably inserted into and electrically connected the coupling part of the mother element, the daughter part being a transformer and having:
        i) at least one output terminal;
        ii) a switch controlling an output current to the at least one output terminal; and
        iii) an input terminal receiving a direct current.

2. The power storage structure according to claim 1, wherein the coupling part of the mother element includes a contact terminal, the daughter element includes a contact part removably connected to the contact terminal.

3. The power storage structure according to claim 1, wherein the daughter element includes a liftable part selectively covering the input terminal.

4. The power storage structure according to claim 1, wherein the input terminal is a cigar-lighter plug for providing the direct current to the daughter element.

5. The power storage structure according to claim 1, wherein each of the at least one output terminal is a socket.

6. The power storage structure according to claim 1, wherein the switch of the daughter element selectively switching the output current from the at least one output terminal of the daughter element to a current selected from a group consisting of an alternating current and a direct current.

* * * * *